United States Patent
Tosco

(10) Patent No.: US 8,727,446 B2
(45) Date of Patent: May 20, 2014

(54) SEAT BACKREST FOR A MOTOR VEHICLE

(75) Inventor: Franco Tosco, Turin (IT)

(73) Assignee: Fiat Group Automobiles S.p.A., Turin (IT)

(*) Notice: Subject to any disclaimer, the term of this patent is extended or adjusted under 35 U.S.C. 154(b) by 24 days.

(21) Appl. No.: 13/368,389

(22) Filed: Feb. 8, 2012

(65) Prior Publication Data

US 2012/0200137 A1    Aug. 9, 2012

(30) Foreign Application Priority Data

Feb. 9, 2011  (EP) ..................................... 11425027

(51) Int. Cl.
*A47C 7/02*   (2006.01)

(52) U.S. Cl.
USPC ............. 297/452.59; 297/452.58; 297/452.48

(58) Field of Classification Search
USPC ............. 297/452.18, 452.48, 452.55, 452.58, 297/452.59
See application file for complete search history.

(56) References Cited

U.S. PATENT DOCUMENTS

| 4,332,419 | A  | * | 6/1982  | Vogel ...................... 297/440.22 |
| 5,575,533 | A  | * | 11/1996 | Glance ........................ 297/452.2 |
| 5,662,381 | A  | * | 9/1997  | Roossien et al. ........... 297/301.1 |
| 6,199,252 | B1 | * | 3/2001  | Masters et al. ................. 29/91.1 |
| 6,347,836 | B1 | * | 2/2002  | Hayotte ...................... 297/452.2 |
| 6,742,847 | B2 | * | 6/2004  | Yanai ........................ 297/452.2 |
| 7,753,443 | B2 | * | 7/2010  | Uchida ..................... 297/216.13 |
| 8,104,840 | B2 | * | 1/2012  | Tarumi et al. ............ 297/452.48 |

FOREIGN PATENT DOCUMENTS

| DE | 88 13 986 U1     | 1/1989 |
| DE | 10 2006 004467 A1 | 8/2007 |
| DE | 10 2007 042169 A1 | 3/2009 |
| EP | 2 154 054 A1     | 2/2010 |
| FR | 2 611 552 A1     | 9/1988 |

* cited by examiner

*Primary Examiner* — Sarah B McPartlin
(74) *Attorney, Agent, or Firm* — Dickstein Shapiro LLP

(57) ABSTRACT

A seat backrest for a motor vehicle is provided with a supporting structure having a rear plate and a front element, which is ring-shaped and is arranged on the front surface of the rear plate; a padding is arranged on the supporting structure and is covered at the front by a cover, one edge of which is attached to the rear plate; the front element is snap-coupled to the rear plate by means of elastically deformable portions, which constitute part of the rear plate.

10 Claims, 2 Drawing Sheets

SEAT BACKREST FOR A MOTOR VEHICLE

The present invention relates to a seat backrest. In particular the present invention relates to a backrest of a rear seat of a motor vehicle.

BACKGROUND OF THE INVENTION

As is known, the rear seats of motor vehicles define the front surface of the luggage compartment and must therefore be sufficiently robust to withstand impact forces of the luggage against said surface in case of sudden braking or even in the event of an accident. For that purpose, the rear seats have a padding with a padding cover and a rear structure, that supports the padding and is made of metal material. Said structure normally comprises a substantially vertical plate, to which the edge of the cover is attached, and a tubular element, which extends in a circular fashion on the front surface of the plate and is welded to said plate. Lastly, a panel made of plastic material covers the rear surface of the plate of the metal structure, so as to define an aesthetic finish towards the luggage compartment.

To assemble the structure, during welding operations the plate and the tubular element must be held in contact, in relatively fixed positions, involving the use of relatively complex and expensive equipment.

SUMMARY OF THE INVENTION

The purpose of the present invention is to provide a seat backrest, which overcomes the drawback described above in a simple and cost-effective manner.

BRIEF DESCRIPTION OF THE DRAWINGS

In order to better understand the present invention, a non-limiting preferred embodiment thereof will now be described by way of example with reference to the accompanying drawings, in which.

DETAILED DESCRIPTION OF THE INVENTION

Figure 1:
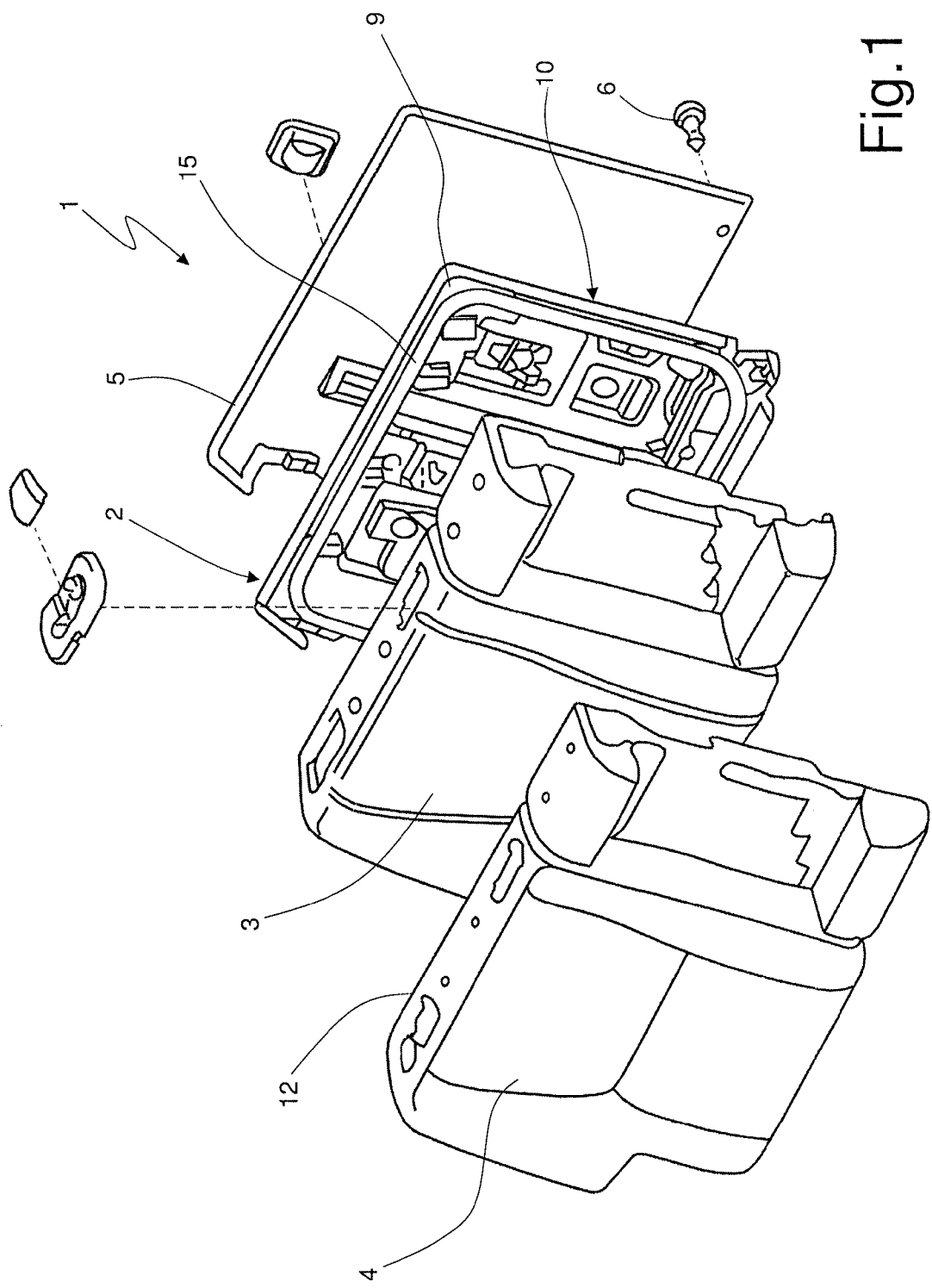
FIG. 1 is an exploded perspective view of a preferred embodiment of the seat backrest according to the present invention.

In FIG. 1, number 1 indicates a seat backrest, mounted in a last row of seats in a motor vehicle.

The backrest 1 comprises a rear structure 2, preferably made of metal material; a padding 3, for example made of foam, and supported by the structure 2; a cover 4, for example made of fabric, which covers the front and sides of the padding 3; and a finishing panel 5, which is preferably made of plastic material, covers the back of the structure 2, constitutes the front face of a luggage compartment (not illustrated) of the motor vehicle and is attached to the structure 2 in a conventional manner, for example by means of buttons 6 which are snap-coupled to a plate 9 of the structure 2.

Figure 3:
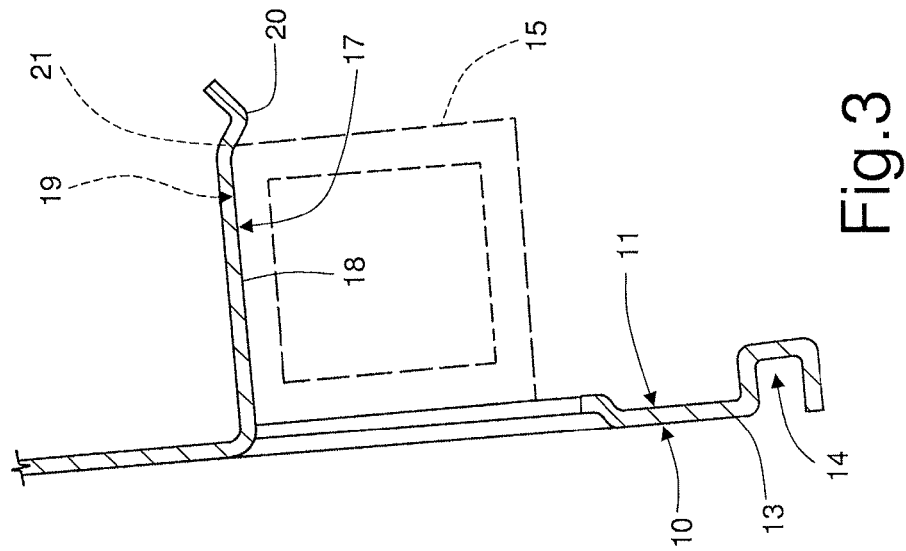
FIG. 3 is a cross-sectional view, on an enlarged scale, along the line of FIG. 2.
Figure 2:
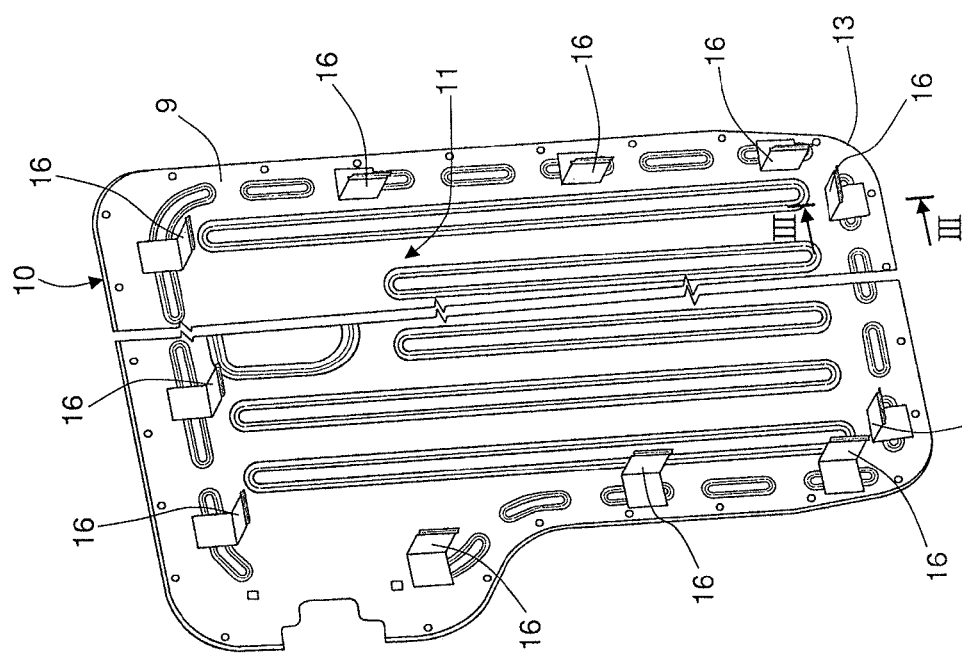
FIG. 2 is a partial and enlarged scale view of a component of the seat backrest of FIG. 1.

With reference to FIGS. 2 and 3, the plate 9 is preferably a one-piece construction and is delimited by a rear surface 10 which faces the panel 5 and a front surface 11 upon which the padding 3 rests. The cover 4 is attached to the plate 9 and, in particular, has an end edge 12 (FIG. 1) attached to an annular perimeter portion 13 of the surface 10 in a conventional manner that is not described in detail. As shown in FIG. 3, the portion 13 defines a groove 14, which houses the end edge 12.

The structure 2 also comprises an element 15 (illustrated by the dashed line in FIG. 3) that is ring-shaped, arranged in front of the surface 11 and is coupled in a fixed position to the plate 9. The element 15 is preferably a tubular element, with a closed cross-section.

According to the invention, a plurality of elastically deformable portions 16 are provided to snap-couple the element 15 to the plate 9. According to the embodiment that is illustrated, the portions 16 are borne by the plate 9 in fixed positions and, preferably, are formed in one piece with the plate 9. The portions 16 are spaced from one another and distributed along an annular path that corresponds to the position in which the element must be coupled. The element 15, in particular, is press-coupled by moving it towards the plate 9 in a direction orthogonal to the surface 11.

The portions 16 are defined by flaps, which protrude transversely with respect to the surface 11 and have a profile that is shaped so as to hold the element 15 against the surface 11. In particular, the flaps 16 have a shaped face 17, comprising a portion 18 that rests on a side surface 19 of the element 15, and a retaining portion 20, for example a projection, that rests on an edge 21 of the element 15 and holds the element 15 against the surface 11 in a substantially fixed position.

Thanks to the snap-on coupling system, the element 15 is arranged directly on the plate 9 during the assembly of the structure 2, without the need for any special positioning tools. At this point, the portions 16 hold the plate 9 and the element 15 in a relatively fixed position, and the element 15 can be fixed in a permanent, i.e. unreleasable manner, to the plate 9, for example by means of glued seams or points. No special equipment is required to hold the two components in relatively fixed positions during the latter fixing operations, since the previously performed snap-on coupling is sufficient.

From the above description it is apparent that the backrest can be produced more quickly and cheaply than using prior art welding processes, which involve the use of dedicated tools and/or templates to hold the two components in a relatively fixed position. Moreover, the portions 16 hold the plate 9 against the element 15 during polymerisation of the adhesive, without having to drill and/or rivet the components.

Moreover, the plate 9 is relatively simple to produce, without the need for any changes to the element 15 with respect to the prior art solutions.

Lastly, from the above description, it is clear that modifications and variations may be made to the backrest 1 described herein without departing from the scope of the present invention as set forth in the appended claims.

In particular, the snap-coupling process could be followed by a direct fixing process other than gluing, to couple the element 15 firmly to the plate 9 before inserting the padding 3. The adhesive, or similar direct fixing process, between the element 15 and the plate 9 could even be absent, provided the retaining force exerted by the portions 16 is strong enough to prevent the accidental uncoupling of the element 15 before and during the coupling of the padding 3. In this case, the cover 4 is attached to the plate 9 so as to hold the element 15 in a fixed position between the plate 9 and the padding 3, once production of the backrest 1 is complete.

The panel 5 could be absent; and/or the plate 9 and/or the element 15 could be made of a material other than the metal as described above, for example of plastic material or a composite material, in particular to make the structure 2 lighter, but strong enough to meet the relevant safety requirements (i.e. to prevent luggage from entering the passenger compartment from the rear luggage compartment).

Moreover, the elastically deformable portions could consist of parts that are separate from the plate 9 and attached to the plate 9; or they could consist of parts fixed to the element 15 or of portions of the element 15, and be snap-coupled into respective slits or seats in the plate 9.

The invention claimed is:

1. A seat backrest for a motor vehicle, the backrest comprising: a supporting structure comprising:
   a) a rear plate having a front surface;
   b) a front element that is ring-shaped and is arranged in front of said front surface;
   c) snap-on means for coupling said front element to said rear plate in a fixed position; a padding arranged on said supporting structure; a cover which covers a front of said padding and has one edge directly attached to said rear plate; wherein said snap-on means comprise coupling means arranged on said front surface in positions distributed along an annular path corresponding to the position of said front element.

2. A seat backrest according to claim 1, wherein said snap-on means comprise elastically deformable portions borne by one of said rear plate and said front element and comprising retaining means for holding the other of said rear plate and said front element in a substantially fixed position.

3. A seat backrest according to claim 2, wherein said coupling means are defined by said elastically deformable portions.

4. A seat backrest according to claim 3, wherein said elastically deformable portions are defined by flaps, which are borne by said plate and protrude transversely with respect to said front surface.

5. A seat backrest according to claim 4, wherein said flaps are formed in one piece with said plate.

6. A seat backrest according to claim 4, wherein said flaps have one face comprising a first portion, that rests on a side surface of said front element, and a second portion, which defines said retaining means and rests on an edge of said front element.

7. A seat backrest according to claim 1, wherein the front element has a tubular cross-section.

8. A seat backrest according to claim 1, further comprising a panel coupled to a rear surface of the rear plate.

9. A seat backrest for a motor vehicle, the backrest comprising: a supporting structure comprising:
   a rear plate having a front surface and a rear surface;
   a ring-shaped front element arranged adjacent to the front surface;
   a padding arranged on the supporting structure;
   a cover which covers a front of the padding and has at least one edge directly attached to the rear plate;
   a panel attached to the rear surface of the rear plate; and
   snap-on means for coupling the front element to the rear plate in a fixed position, wherein the snap-on means comprise coupling means arranged on the front surface in positions distributed along an annular path corresponding to the position of the front element.

10. A seat backrest according to claim 9, wherein the front element has a tubular cross-section.

* * * * *